Patented Apr. 24, 1951

2,549,827

UNITED STATES PATENT OFFICE 2,549,827

RECOVERY OF ADENYLIC ACID

Louis Laufer, Brooklyn, and Earl D. Stewart, White Plains, N. Y., assignors to Schwarz Laboratories, Inc., a corporation of New York No Drawing. Application August 7, 1946, Serial No. 688,974

16 Claims. (Cl. 260—211.5)

The present invention is concerned with the recovery of pure adenylic nucleotides in large percentage from any of various sources thereof including pure nucleic acid, crude nucleic acid solutions, salts of nucleic acid, and crude extracts of yeast, muscle, glandular tissue or other nucleic acid or nucleotide bearing substances.

It is among the objects of the invention to provide a process for the above purpose, involving a simple technology which dispenses with the need for tedious fractional crystallization of brucine or other alkaloid salts or the use of picric acid or other organic compounds, but which by resort solely to inorganic reagents, affords a high yield of pure adenylic acid.

In the prior patents of Louis Laufer and Jesse Charney, Nos. 2,379,913 and 2,379,914, issued July 10, 1945, there is taught a technique for segregating the purines from the pyrimidines by resort to a cuprous salt which selectively precipitates the former and leaves the latter in solution. These patents are concerned largely with the further treatment of the precipitate for the recovery of pentoses therefrom. The present invention is concerned essentially with the further treatment of the cuprous salts of purine nucleotides to remove the guanylic acid therefrom, with the recovery of the adenylic acid.

According to the invention in general outline, the adenylic acid is separated from the guanylic acid by a series of steps which includes suspension of the cuprous salts of purine nucleotides in water, precipitating the copper by the addition of a copper precipitating agent such as a soluble sulphide, with resultant filtrate of adenylic and guanylic acid or soluble salts thereof. The guanylic acid is precipitated from that solution by the addition of a precipitating agent comprising either a mixture of alcohol and aqueous solution of a salt such as sodium acetate or a weak acid solution of alkaline earth metal, as for instance barium acetate. The salt of adenylic acid dissolved in the filtrate is precipitated with a heavy metal salt, preferably with lead acetate and the lead is then desirably precipitated from suspension by a soluble sulphide, such as sodium sulphide, yielding a solution of sodium adenylate. The sodium adenylate remaining in solution is converted into adenylic acid by acidification with an acid such as hydrochloric, whose sodium salt is soluble at the concentration of use and at the pH of a saturated solution of adenylic acid. Alternatively, the precipitation of the lead may be effected by introducing hydrogen sulphide into the solution to yield adenylic acid directly. From the adenylic acid solution, whether produced by the first or by the alternative procedure, pure adenylic acid is crystallized out.

According to the invention in its salient steps, the washed copper purine nucleotide precipitate prepared according to the teachings of the patents above identified, is suspended in water and treated with a copper precipitating agent, preferably sodium sulphide, hydrogen sulphide or other soluble sulphide by which the copper is thrown out as very insoluble copper sulphide, though such soluble salts as those of oxalic, phosphoric, ferrocyanic, silicic or carbonic acids, may be used for precipitation of the copper. After filtration of the precipitate, there is left a filtrate of adenylic and guanylic acid or soluble salts thereof.

After adjustment of the pH of said filtrate to the range between 6.0 and 8.0, the solution is subjected to either of two alternative treatments to precipitate the guanylate, while keeping the adenylate in solution.

According to one of these alternatives, the solution is treated with an alkaline earth metal salt having an anion not precipitated by lead or similar metals. Examples of such alkaline earth metal salts are the acetate, chloride or nitrate of calcium, magnesium, barium and strontium. The addition of such alkaline earth metal salt solution results in a coarse precipitate of the guanylate of the alkali earth metal while the adenine nucleotide remains in solution. Where barium acetate is used for the purpose as preferred, there results a precipitate of barium guanylate. Substantially complete precipitation of the guanylate may be effected if the solution of the salt is continually added until no further precipitate results upon centrifuging after adding a further drop of barium solution to the clear centrifugate. After separation of the precipitate by filtration or otherwise, and washing the same to remove any adenylate solution therefrom, a clear solution of barium adenylate remains.

An alternative procedure for precipitating the guanylate and leaving the adenylate in solution, involves the addition to the filtrate above referred to (whose pH had been adjusted to between 6.0 and 8.0), of a mixture of alcohol with a solution of a salt whose anion is not precipitated by lead. Sodium acetate, sodium chloride or sodium nitrate are suitable for the purpose. Desirably the mixture consists of equal volumes of 95% of monohydric, preferably ethyl alcohol and aqueous solution of 200 grams of crystallized sodium acetate per liter.

In the treatment last described, the sodium guanylate is thrown down as a curdy more or less white precipitate and much of the sodium sulphate will also be precipitated, especially if the solution is chilled as preferred. Such precipitation of sodium sulphate is desirable, since it reduces the concentration of the sulphuric acid remaining after effecting the cuprous precipitation according to the teachings of the patents above identified and the presence of which would tend to contaminate the product and interfere with the subsequent crystallization of the adenylic acid. The precipitate is removed by filtration and washed, the filtrate in this case being chiefly sodium adenylate with sodium acetate in a solution of alcohol and water.

Of the two alternative processes above set forth for precipitating the guanylate and separating it from the adenylate, the former is generally preferred because it has the advantage that stray sulphate ions are precipitated, especially when the barium or strontium salts are used and thus sulphate ions are more effectively excluded from the final solution.

Regardless which of the two alternative processes above set forth is employed for precipitating out the guanylic acid, whether as the alkali earth metal salt thereof, such as the barium guanylate in the first of these alternatives, or as the alkali metal salt thereof such as the sodium guanylate in the second of said alternatives, the adenylic acid is precipitated from solution by any of a number of alternative processes now to be described.

According to one process, the same procedure set forth in the prior patents above identified and utilizing cuprous salts, may be resorted to for precipitating cuprous adenylate. Silver, mercury, iron or cupric salts, might be used for the purpose instead of cuprous salts.

For present purposes, however, lead is preferable even to copper, because the lead precipitate is quite as insoluble as that of copper and easier to filter and wash. To carry out the precipitation with lead, lead acetate solution is added to the solution of adenylate salt, resulting in a voluminous white precipitate of adenylic acid as lead adenylate.

While the alkali salts of adenylic acid are highly soluble, the adenylic acid itself is relatively insoluble and this property is utilized for recovery of the adenylic acid crystals from the solution. To this end, the adenylate is precipitated as a heavy metal salt thereof, then suspended in water and treated with alkali sulphide to precipitate the heavy metal as the sulphide thereof and leave the alkali salt of adenylic acid in solution. The solution of alkali adenylate is concentrated to a volume smaller than that of a saturated solution of the adenylic acid equivalent of the alkali adenylate content and is then acidified with mineral acid, whereupon the excess adenylic acid crystallizes out of the solution. Alternatively, hydrogen sulphide is introduced into the suspension of heavy metal salt of adenylic acid, to convert the latter into adenylic acid without the need to add mineral acid.

In a preferred procedure, an aqueous suspension of the lead adenylate is mixed with sodium sulphide, though chromate, phosphate, oxalate, tartrate or carbonate may be used. A metathesis results, in which in case of the preferred sulphide, the lead is precipitated as heavy insoluble lead sulphide which is filtered off and discarded. The filtrate of sodium adenylate with some alkali sulphide is now acidified to pH 6.5 to 7.5 by resort to any acid whose alkali salt is soluble at the concentration of use and at the pH of a saturated solution of adenylic acid. For this purpose a strong mineral acid is desirable and hydrochloric acid is preferred. The solution is now evaporated, preferably in a vacuum to a small fraction, illustratively to 25 per cent of its initial volume. In this concentration process, some of the sulphide may separate out as elemental sulphur and may be coagulated and removed by the addition of hydrochloric acid, preferably to a pH of 3.5, the solution being heated to boiling if necessary. Upon filtering, there results a brilliant, colorless to slightly yellow solution which contains relatively pure sodium adenylate and adenylic acid in relatively high concentration, that is 100 grams or more per liter, together with the chloride formed during the pH adjustments.

It is a property of adenylic acid that its alkali salt solutions, when concentrated beyond the saturation solubility of the adenylic acid they contain, will, when acidified with strong acid, readily form supersaturated solutions of adenylic acid which have a pH lower than the pH of a saturated solution thereof. This property is resorted to, according to one aspect of the present invention, to effect crystallization of the adenylic acid from solution. Ideally the pH prior to inception of crystallization, should be exactly far enough below the saturation pH so that when crystallization is complete, the pH of the saturated adenylic acid solution is reached, but this can only be approximated in commercial practice.

To separate substantially pure adenylic acid crystals, the solution is first cooled to room temperature and then its pH is reduced by the addition of relatively concentrated acid, preferably 38% hydrochloric acid, to avoid undue addition to the volume, until the pH is somewhat below that of a saturated solution of adenylic acid. For a solution such as that here being treated, which has 100 grams or more of aldenylic acid per liter, the pH would desirably be brought to 2.5 where that of saturated adenylic acid would be between 2.7 and 2.8. As a consequence, excess adenylic acid will crystallize out of the resultant supersaturated solution with rise in pH to that of the saturated solution.

After separation of such crystals from the mother liquor, the cycle of evaporation, acidification and crystallization from supersaturated solution may be repeated one or more times for greater recovery of the adenylic acid.

An alternative procedure for recovering the adenylic acid from the adenylate, but which is not preferred, is to utilize hydrogen sulphide instead of sodium sulphide for precipitation of the lead sulphide. After filtering and washing, the filtrate is evaporated in vacuo at about 40° C., and then cooled or refrigerated, preferably to 0 to 5 degrees C. with resultant crystallization in the form of rosettes of very short needles. These crystals are washed and then dried in a vacuum drier and the process of evaporation and crystallization is repeated one or more times.

Tracing the process through in one of its embodiments from the original crude biologic substance to the yield of pure adenylic acid crystals, the steps may be summarized as follows:

1. Neutralize the biologic extract, if necessary, and hydrolyze the same to break it down into its constituent nucleotides.

2. Treat as for instance with a solution of copper sulphate, to precipitate any gum, yielding a filtrate which is an alkaline solution of alkali salts both of the purine nucleotides, adenylic and guanylic acid and of the pyrimidine nucleotides, cytidylic and uridylic acids.

3. Adjust to pH 5.0 to 7.0, preferably 6.0, with sulphuric acid or other acid not precipitated by the cuprous ion and raise the temperature.

4. Add a mixture of cuprous salt and sodium bisulphite to the hot solution with resulting selective precipitation of the purine nucleotides (adenylic and guanylic acids) and keep the pH substantially constant to prevent solution of the precipitated copper purine nucleotides or precipitation of the pyrimidine nucleotides.

5. Separate the copper purine nucleotide precipitate from the unprecipitated pyrimidines, suspend said precipitate in water and precipitate the copper therefrom by addition of a soluble sulphide.

6. After adjusting the pH of the filtrate to pH 6.0 to 8.0, treat with alkaline earth metal salt selectively to precipitate the guanylate and to leave the adenylate in solution.

7. Treat the filtrate with heavy metal salt, preferably lead acetate, to precipitate lead adenylate.

8. Suspend the precipitate in water and treat with alkali sulphide to precipitate the lead.

9. Acidify filtrate to pH 6.5 to 7.5 and concentrate by evaporation.

10. Cool to room temperature and add concentrated hydrochloric acid to pH 2.5 to produce supersaturated solution of adenylic acid from which excess adenylic acid crystallizes.

11. The mother liquors are reworked to yield additional adenylic acid.

While the foregoing description is believed to set forth the procedure with the detail required by the statutory requirements, one or more procedures will now be set forth in detail.

Example I

One gram molecular weight or 1300 grams of yeast nucleic acid is mixed with 32 liters of water and fifty per cent (50%) sodium hydroxide is added with vigorous stirring until all the nucleic acid is in solution, and the pH is 9 to 10. After heating to 50° C., 8 liters of one per cent (1%) copper sulphate ($CuSO_4.5H_2O$) solution are added and sufficient fifty per cent (50%) caustic soda solution to make the final solution contain eleven grams of sodium hydroxide per liter. It is then allowed to stand about 16 to 20 hours or overnight.

The more or less clear supernatant liquid is siphoned off and filtered, and the sludge in the bottom of the vessel is centrifuged. The centrifuged sludge of copper precipitated gum and impurities is washed once with one per cent (1%) caustic soda and the centrifugate and washings are added to the filtrate. The filtered mixed nucleotide solution is acidified with sulphuric acid to pH 5.7 and heated to 60° C. Cuprous reagent is prepared by mixing 4.2 liters of a solution containing 250 grams of copper sulphate ($CuSO_4.5H_2O$) per liter with 830 ml. of a solution containing 250 grams sodium bisulphite ($NaHSO_3$) per liter. The cuprous reagent is added rapidly to the warm mixed nucleotide solution along with sufficient fifty per cent (50%) caustic soda to maintain the pH at 5.7. A green-white precipitate forms which is filtered off immediately and washed with 21 liters of hot water. The filtrate contains the pyrimidine nucleotides and may be reserved for their recovery or discarded.

The copper purine nucleotide precipitate is mixed with 10 liters of water in a suitable reaction vessel and hydrogen sulphide is passed into it under slight pressure and vigorous stirring until the reaction is complete and all the copper is precipitated as copper sulphide. The copper sulphide is filtered off, washed well and discarded. Filtrate and washings are aerated until free of hydrogen sulphide.

The volume of filtrate and washings of about 12 liters is brought to pH 7.0 with fifty per cent (50%) caustic soda and 200 grams of crystallized sodium acetate is added per liter of solution, followed by the addition of ninety-five per cent (95%) alcohol by volume, in volume equal to that of the solution, and stirring well during the addition. A curdy white precipitate of sodium guanylate forms which is allowed to age overnight, preferably at 0 to 5 degrees C.

The sodium guanylate is filtered off and washed well with fifty per cent (50%) alcohol by volume containing 100 grams sodium acetate per liter. The precipitate is reserved for recovery of the guanine nulceotide or its hydrolysis products. The alcoholic filtrate contains the adenine nucleotide.

The adenylic acid is precipitated as the lead salt thereof by adding twenty-five per cent (25%) neutral lead acetate solution until no further precipitate forms and is allowed to age overnight at low temperature before filtering.

The lead adenylate is filtered off and washed free of lead and acetate ions, the alcoholic filtrate being reserved for alcohol recovery. The well washed precipitate is suspended in an equal volume of water in a suitable reaction vessel and hydrogen sulphide is passed into the mixture with vigorous stirring. When the reaction is complete, the lead sulphide is removed by filtration and after washing well is discarded. The filtrate and washings, which may amount to 12 to 15 liters, are aerated until free of hydrogen sulphide, and then concentrated in vacuo at about 40° C. to a small volume. Crystallization usually takes place during evaporation and is completed at 0 to 5 degrees C.

The crystals are centrifuged or filtered from the mother liquor, washed with ice water, and dried preferably in vacuo at room temperature. The mother liquor and washings may be evaporated to obtain a second crop of crystals but are best salvaged by treating with sodium acetate and alcohol to remove any guanylic acid carried through the process and then proceeding as just outlined. Mother liquor and washings from several batches may be combined for this treatment.

The yield of adenylic acid according to the above procedure is about 150 grams or forty-two per cent (42%) of theoretical.

Example II

The copper nucleotide precipitate is prepared exactly as in Example I. Instead of passing hydrogen sulphide into the water suspension, a solution of sodium sulphide containing 250 grams per liter is added until all the copper is precipitated as the sulphide. This may be determined by the pH which is 10 to 11 at completion of the reaction, or by the appearance of the solution in a pipette, or glass cylinder, for at the end point the solution becomes clear and the copper sulphide settles rapidly.

The copper sulphide is filtered off, washed and discarded. The filtrate and washings which are dark brown to black are adjusted to pH 7.0 with acetic acid and a solution containing 250 grams of barium acetate per liter is added until no further precipitate forms. The precipitate and solution are chilled, preferably to 0 to 5 degrees C. and permitted to age overnight. The precipitate of barium guanylate is filtered out, washed with five per cent (5%) barium acetate solution and reserved for recovery of the guanine nucleotide and its hydrolysis products.

The solution of sodium adenylate containing barium acetate which may have a volume of 15 to 20 liters, is precipitated with neutral lead acetate solution as in Example I and allowed to stand overnight to age.

The lead adenylate precipitate is washed well and filtrate and washings are discarded. The lead salt precipitate is treated with sodium sulphide in exactly the same way as the copper nucleotide previously mentioned. The lead sulphide is filtered off, washed well and discarded. The alkaline solution of sodium adenylate which may have a volume of 10 liters is acidified with hydrochloric acid to pH 7.0 and concentrated by evaporation, preferably in vacuo to a volume of 1½ to 2 liters. Additional acid is added to bring the pH to 3.5. The solution is heated to boiling and the coagulated sulphur filtered off. A brilliant, colorless to light yellow, filtrate is obtained which is cooled to room temperature and acidified with thirty-eight per cent (38%) hydrochloric acid to pH 2.5. A few crystals of adenylic acid are added and the solution is stirred until it becomes cloudy and crystals begin to form. It is allowed to stand at room temperature for 24 hours and then chilled 0 to 5 degrees C. until crystallization is complete. The crystals are filtered off, washed with ice water and dried, preferably in vacuo, at temperatures of say 40 to 50 degrees C. The mother liquors may be reworked to yield additional adenylic acid. The mother liquors are best salvaged by starting at the barium precipitation stage.

The yield according to the foregoing process, of adenylic acid is 150 to 160 grams or forty to forty-five per cent (40% to 45%) of theoretical.

Higher yields of adenylic acid are obtainable, then those above indicated, depending on the material, the care used in precipitating the cuprous nucleotides, washing precipitates and reworking of mother liquors. By careful manipulation, theoretical yields may be approached.

As many changes could be made in the above process, and many apparently widely different embodiments of this invention could be made without departing from the scope of the claims, it is intended that all matter contained in the above description shall be interpreted as illustrative and not in a limiting sense.

Having thus described our invention, what we claim as new and desire to secure by Letters Patent of the United States is:

1. The process of segregating adenylic nucleotides from solutions containing also guanylic nucleotides, but substantially devoid of pyrimidines, which comprises the addition to such solution of an aqueous solution of a member of the group consisting of (a) an alkali metal salt, the anion of which is not precipitated by lead, said solution being a admixture with alcohol, and (b) an alkali earth metal salt, the anion of which is not precipitated by lead, with resultant selective precipitation of the guanylate thereof while the adenylate thereof remains in solution, the separation of the solution and the precipitation of the adenylic acid therefrom by the addition of a heavy metal salt, the precipitation of the heavy metal salt by the addition of a soluble sulphide and the separation of the precipitated heavy metal sulphide.

2. The process of segregating adenylic nucleotides from copper purine nucleotide precipitate, which comprises the suspension of such precipitate in water, the treatment of the suspension by a copper precipitating agent, the filtering off of the precipitated material, the adjustment of the pH of the remaining solution to substantial neutrality, the addition thereto of an aqueous solution of a member of the group consisting of (a) an alkali metal salt, the anion of which is not precipitated by lead, said solution being in admixture with alcohol, and (b) an alkali earth metal salt, the anion of which is not precipitated by lead, with resultant selective precipitation of the guanylate thereof while the adenylate thereof remains in solution, the separation of the solution and the precipitation of the adenylic acid therefrom by heavy metal salt, the precipitation of the heavy metal by the addition of a soluble sulphide and the separation of the precipitated heavy metal sulphide.

3. The combination recited in claim 2 in which the copper precipitating agent is sodium sulphide and the pH of the resultant solution is adjusted to 6.0 to 8.0 with acetic acid prior to the precipitation of the guanylate.

4. The combination recited in claim 2 in which the copper precipitating agent is hydrogen sulphide and the pH of the resultant solution is adjusted to 6.0 to 8.0 with sodium hydroxide prior to the precipitation of the guanylate.

5. The combination recited in claim 2 in which the soluble salt that precipitates the guanylate is a salt of an alkali metal whose anion is not precipitated by lead and in which the solution thereof is admixed with monohydric alcohol.

6. The process claimed in claim 2 in which the soluble metal salt that precipitates the guanylate has its anion selected from the group consisting of acetate, chloride and nitrate, and in which the solution of alkaline earth metal salt is added until no further precipitation occurs and in which the solution is adjusted to pH 6.0 to 8.0 prior to addition of the alkaline earth metal salt solution.

7. The combination recited in claim 2 in which the soluble salt that precipitates the guanylate is selected from the group consisting of the acetate, chloride and nitrate of an alkali metal and in which the solution thereof is admixed with ethyl alcohol.

8. The process of recovering adenylic acid from solutions containing nucleic acid, which comprises the hydrolyzation of the nucleic acid in the presence of caustic to break it down into its component purine and pyrimidine nucleotides, the precipitation of the purine nucleotides while maintaining the pyrimidine nucleotides in solution, the separation of the purine nucleotide precipitate, the solution thereof, the addition to the solution of an aqueous solution of a member of the group consisting of (a) an alkali metal salt, the anion of which is not precipitated by lead, said solution being in admixture with alcohol, and (b) an alkali earth metal salt, the anion of which is not precipitated by lead, with resultant selective precipitation of the guanylic compound of the purine nucleotides to form a precipitate of the guanylate of said metal, while forming an adenylate that remains in solution, the separation of the precipitate, the precipitation of the adenylic acid by a heavy metal salt, the precipitation of the metal by the addition of a soluble sulphide and separation of the precipitated heavy metal sulphide, and acidification of the remaining solution for crystallization of the adenylic acid therefrom.

9. The combination recited in claim 8 in which the solution that includes a soluble salt of a metal that combines with the guanylic compound is an aqueous solution of barium acetate.

10. The combination recited in claim 8 in which the solution that includes the soluble salt of a metal that combines with guanylic acid is a solution of an alkali metal salt thereof and is admixed with monohydric alcohol.

11. The combination recited in claim 8 in which the solution that includes the soluble salt of a metal that combines with guanylic acid consists of substantially equal parts by volume of 95% monohydric alcohol and 200 grams of sodium acetate per liter.

12. The process of recovering substantially pure adenylic acid from a solution of a soluble salt thereof, which consists in adding thereto a soluble metal salt of the type that precipitates the adenylate thereof from solution, then adding a sulphide thereto to precipitate the said metal as the sulphide and to leave the adenylate in solution, concentrating the solution to a volume smaller than that of a saturated solution of the adenylic acid equivalent of the adenylate content, acidifying the solution to a pH of about 2.5, and crystallizing the adenylic acid from solution.

13. The process of recovering adenylic acid from a solution having a concentration of relatively pure adenylic acid and its alkali salt greater than that of a saturated solution of the adenylic acid equivalent of the adenylate content, which comprises acidifying the solution with mineral acid to pH a little below that of a saturated solution of adenylic acid, and separating the pure adenylic acid crystals thus precipitated from the resultant supersaturated solution.

14. The process of recovering substantially pure adenylic acid from an aqueous solution of adenylic acid and sodium adenylate having a combined concentration in excess of 100 grams per liter on the basis of adenylic acid, which comprises acidifying the solution with hydrochloric acid of high concentration at substantially room temperature to pH of about 2.5, and separating the crystals of pure adenylic acid formed from the resultant supersaturated solution.

15. The process of recovering adenylic acid from a solution of soluble salt thereof, which consists in adding thereto lead acetate with resultant precipitation of lead adenylate, adding sodium sulphide for precipitation of the lead, acidifying the filtrate to pH 6.5 to 7.5 with an acid whose alkali salt is soluble at the pH of a saturated solution of adenylic acid, concentrating the solution by evaporation to a volume smaller than that of a saturated solution of the adenylic acid equivalent of the adenylate content, adding mineral acid for coagulating any sulphur separating in the process, and crystallizing out the adenylic acid from the filtrate.

16. The combination recited in claim 15 in which said filtrate is treated with mineral acid of high concentration to bring its pH to slightly below that of a saturated solution of adenylic acid, in which the crystals of adenylic acid separated from the resultant supersaturated solution are removed and the cycle of concentration, acidification and removal of crystals is repeated one or more times on the mother liquor.

LOUIS LAUFER.
EARL D. STEWART.

REFERENCES CITED

The following references are of record in the file of this patent:

UNITED STATES PATENTS

| Number | Name | Date |
| --- | --- | --- |
| 1,976,175 | Lautenschlager et al. | Oct. 9, 1934 |
| 1,977,525 | Ostern | Oct. 16, 1934 |
| 2,379,913 | Laufer et al. | July 10, 1945 |
| 2,379,914 | Laufer et al. | July 10, 1945 |

OTHER REFERENCES

Hoppe-Seyler—Zeitschrift fur Physiologische Chemie, vol. 127, pages 262–267 (1923).